United States Patent
Cohen

[11] 4,005,618
[45] Feb. 1, 1977

[54] TRANSMISSION WITH CONTINUOUSLY VARIABLE SPEED RATIO

[75] Inventor: William A. Cohen, Brooklyn, N.Y.

[73] Assignee: Sphero International Co., Brooklyn, N.Y.

[22] Filed: Sept. 29, 1975

[21] Appl. No.: 617,365

[52] U.S. Cl. .................................. 74/640; 74/804
[51] Int. Cl.² ...................................... F16H 33/00
[58] Field of Search ............ 74/804, 805, 325, 392, 74/393, 394, 640, 332, 352, 353, 354, 435, 437, 439, 793

[56] References Cited
UNITED STATES PATENTS

| | | | |
|---|---|---|---|
| 1,442,217 | 1/1923 | H'Doubler | 74/352 |
| 2,919,589 | 1/1960 | Sundt | 74/804 X |
| 3,015,972 | 1/1962 | Voigt | 74/640 X |
| 3,116,650 | 1/1964 | Farley | 74/804 X |
| 3,138,960 | 6/1964 | Moo | 74/393 X |
| 3,566,708 | 3/1971 | Brahm | 74/393 |

Primary Examiner—Samuel Scott
Assistant Examiner—Lance W. Chandler

[57] ABSTRACT

Each stage of the transmission includes a composite ring gear for operatively connecting spaced coplanar drive and idler gears on engine and idler shafts, respectively. The ring gear comprises a plurality of rotationally offset element assemblies, each of which includes first and second ring gear sectors, each mounted on a different end of a rotatable element. In this manner, as one gear sector engages the drive gear, the other sector engages the idler gear. Means operably connected to each element assembly of the composite ring gear are provided for varying the position of the axis of rotation of each of the assemblies relative to the drive and idler gears so as to change the ratio of the distances between the axes of rotation of the element assemblies and that of the drive and idler gears, respectively, and thus the speed transfer ratio of the stage. A plurality of such stages are connected in tandem such that the net effect on the final idler shaft equals the product of the speed transfer ratios of the several stages. The means for simultaneously controlling the means for varying the position of the axes of rotation of the element assemblies in each composite ring gear are connected to the throttle and can be varied in minute increments in response to the actuation thereof. In this manner, the speed transfer ratio of the transmission is continuously variable throughout a given range. A differential gear system, controlled by the gear shift lever, is interposed between the engine shaft and the drive gear associated with the first composite ring gear such that the engine shaft is conditionally connected to that drive gear for rotation thereof in a selected direction.

15 Claims, 15 Drawing Figures

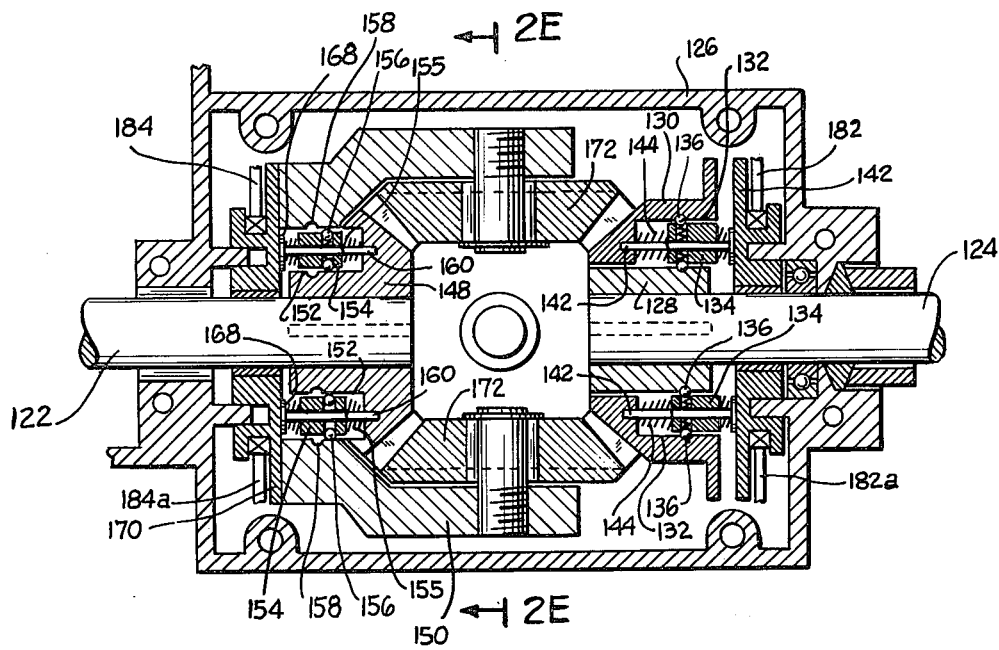
FIG. 2B
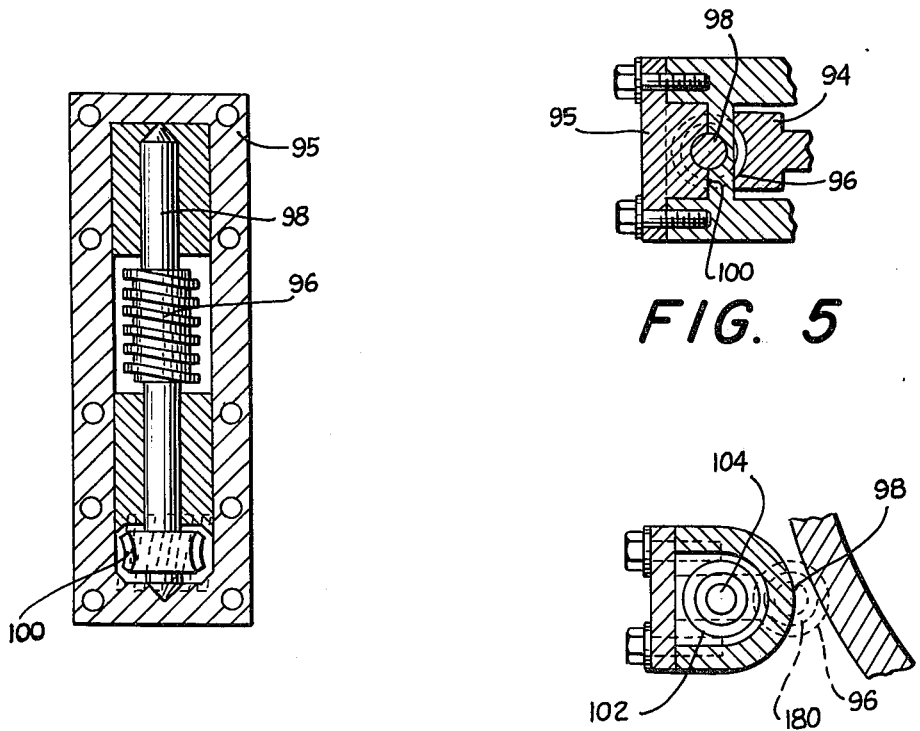
FIG. 8
FIG. 5
FIG. 6

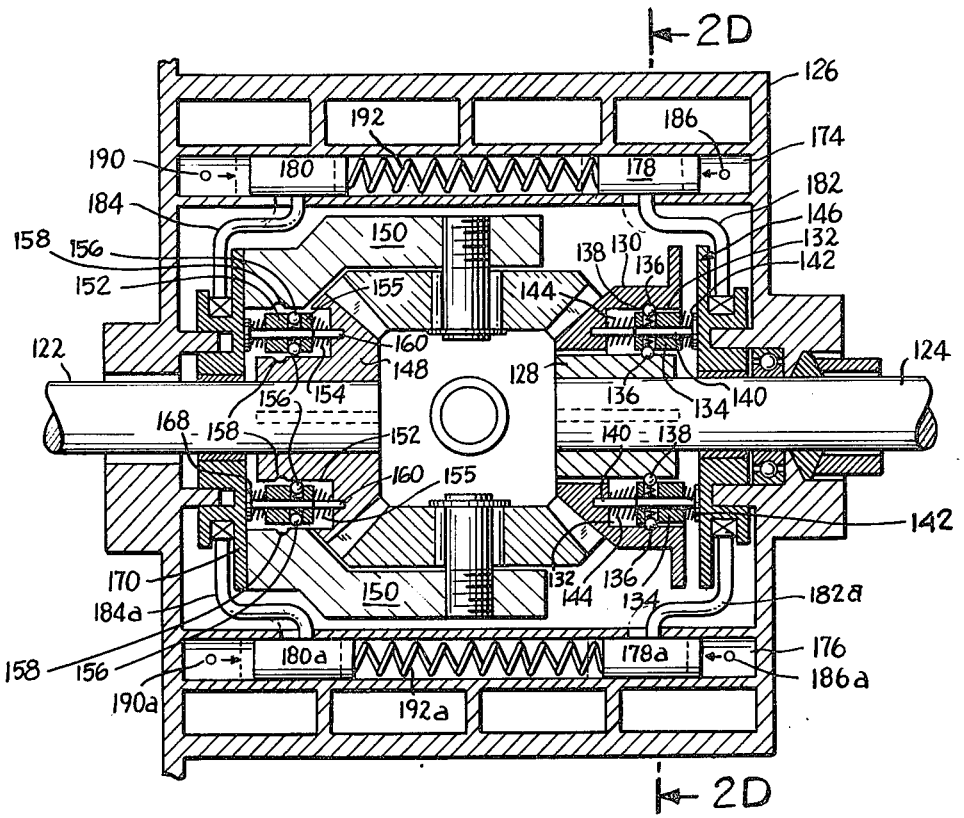
FIG. 2C
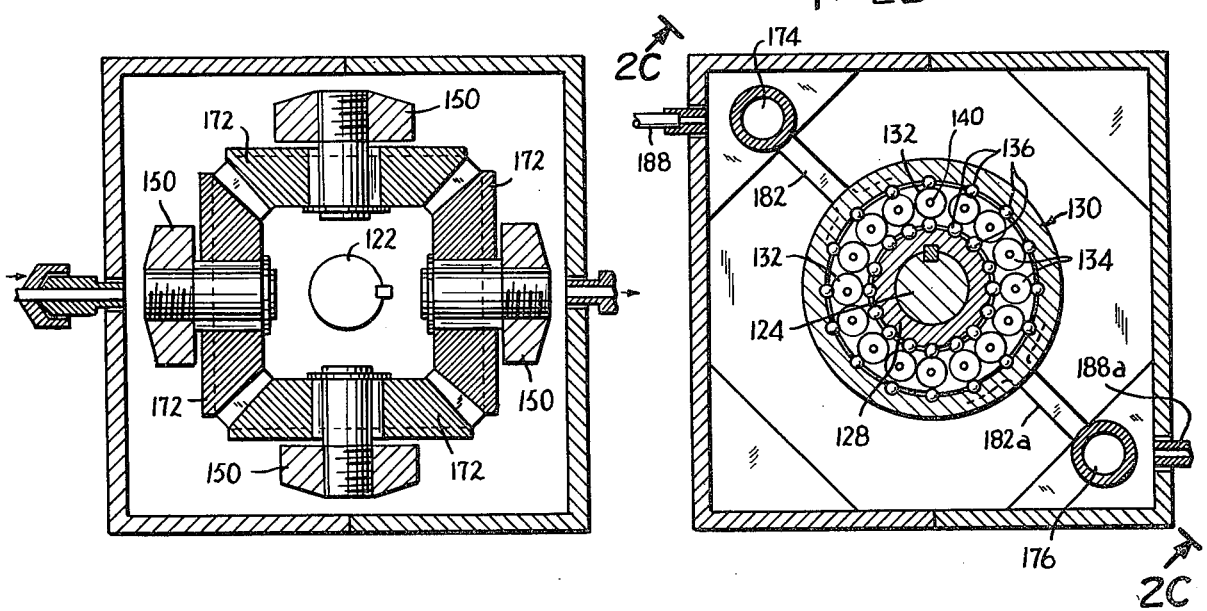
FIG. 2E
FIG. 2D

TRANSMISSION WITH CONTINUOUSLY VARIABLE SPEED RATIO

The present invention relates to a transmission for use in a vehicle or the like and, in particular, to a transmission having continuously variable speed ratios throughout a given ratio range.

Transmissions are utilized in a wide variety of different types of mechanical devices to transmit rotation and torque from a drive shaft to a driven shaft. While a transmission may transmit rotation and torque from the drive shaft to the driven shaft in a single preset transfer ratio, determined by calculating the speed of the input or drive shaft and dividing same by the speed of the output or driven shaft, it is more common, especially in transmissions for use in automotive vehicles and the like, to design the transmission to transmit torque at a selected one of a plurality of different discrete transfer ratios in response to the actuation of a control lever.

The number of different transfer ratios at which the transmission can operate depends upon the application for which it is designed. For instance, the transmission of a conventional automobile may be able to operate at four or five different discrete speed transfer ratios whereas a transmission designed for use in a large truck or bus may be designed for use at many more discrete speed transfer ratios because of the size and the weight of the vehicle.

Transmissions of this type normally comprise a relatively complex system of gears or hydraulic connections or a combination of the two. The greater number and range of different transfer ratios at which the transmission can operate, the greater complexity of the components of the transmission and, thus, the more expensive the transmission is to manufacture, assemble, maintain and repair. On the other hand, the greater the number and range of different transfer ratios at which the transmission can operate, the more efficient the use of the power generated by the power plant connected thereto. Therefore, an efficient transmission may permit the reduction of the power plant size without adversely affecting performance and, thus, contribute substantially to fuel conservation.

The optimum situation, therefore, would be a transmission with a continuously variable speed ratio which could be manufactured relatively inexpensively and which could be repaired and maintained easily. Such a transmission would be useful, for instance, on automotive vehicles and particularly trucks and buses which carry heavy loads over long distances. Such vehicles often travel at the maximum legal speed limits or higher and must negotiate steep upgrades, downgrades and level roadways alike in the shortest possible time. A continuously variable speed transmission would permit such vehicles to climb steep upgrades with a very low range of speed and then travel on downgrades and level roadways in a higher range of speed, thereby utilizing the engine capacity to maximum efficiency because of the wider range of speed transfer ratios possible.

It is, therefore, a prime object of the present invention to provide a transmission having a continuously variable speed ratio.

It is another object of the present invention to provide a transmission having a continuously variable speed ratio which is comprised of a series of relatively simple and inexpensively produced parts which may be manufactured, assembled, maintained and repaired relatively inexpensively.

It is a further object of the present invention to provide a transmission having a continuously variable speed ratio including a plurality of composite ring gear stages, the number of which determines, in part, the range of speed transfer ratios of the transmission.

It is a still further object of the present invention to provide a transmission having a continuously variable speed ratio comprising a plurality of stages, each including a composite ring gear including at least first and second ring gear sectors and a rotatable element, each of the sectors being mounted on a different end of the element and means for varying the position of the axis of rotation of the element to change the ratio of speeds at which the transmission is operated.

It is a still further object of the present invention to provide a transmission having a continuously variable speed ratio utilizing a differential gearing system for conditionally connecting the transmission to the engine shaft so that the transmission will rotate in a selected direction.

In accordance with the present invention, a transmission having a continuously variable speed ratio is provided for transmitting torque from a drive gear to a driven gear. The transmission comprises a composite ring gear with a variable axis of rotation operatively connecting the drive and driven gears. The composite ring gear includes first and second ring gear sectors and a rotatable element. Each of the gear sectors is mounted on a different end of the element such that when one gear sector engages the drive gear, the other gear sector engages the driven gear. Means operatively connected to the element are provided for varying the position of the axis of rotation of the element relative to the drive and driven gears so as to change the ratio of the distances between the axis of rotation of the element and the drive and driven gears, respectively.

In practice, the composite ring gear includes a number of rotationally offset elements, each having a pair of ring gear sectors, one mounted on each end thereof. In this manner, the ring gear sectors overlap each other at the outer extremity thereof forming, in aggregate, a circular gear. Torque is, therefore, constantly transferred from the drive gear to the driven gear regardless of the position of the axis of rotation of the composite ring gear.

Means are provided for mounting the ring gear sectors to the element such that the sectors are laterally shiftable inwardly and outwardly relative to the element to maintain the circular configuration of the composite ring gear at all times. Means are provided for urging the ring gear sectors laterally outwardly from said element such that the elements are always positioned to engage the drive and driven gears at the appropriate rotational position of the composite ring gear. In particular, the mounting means comprises a pair of caps, each of which is slidably mounted on a different one of the ends of the element. One of the gear sectors are pivotallly mounted to each cap. Tension springs are provided at the extremities of the element, each spring bearing against one of the gear sectors so as to urge that sector, and thus the cap upon which it is mounted toward its outermost position.

The axis position varying means includes a fulcrum shaft. A slot is provided in each element extending longitudinally in the direction between the gear sectors mounted thereto. The fulcrum shaft extends into the slots of each element in a composite ring gear at a point which determines the axes of rotation of each element and the speed transfer ratio of each element and thus the composite ring gear as a whole. Means are provided for changing the position of the fulcrum shaft relative to the slots in the elements. These means include movable members, preferably in the form of coaxial rotatable discs between which the composite ring gear is mounted. The ends of the fulcrum shaft are connected to the sides of the discs. A hydraulically controlled motor means is provided for rotating the discs in response to the actuation of the throttle control.

A plurality of successive composite ring gear stages can be operatively connected such that the aggregate transfer ratio thereof is the product of the transfer ratio of each of the individual stages. Each composite ring gear is rotatable about a different fulcrum shaft, displaced 180° apart in the shape of a crankshaft, and means is provided for simultaneously moving each of the fulcrum shafts to vary the axis of rotation and the transfer ratios of each of the composite ring gears in corresponding fashion.

The transmission also comprises apparatus, in the form of a differential gear system, for conditionally transferring torque in a selected direction between the engine drive shaft and the input shaft of the transmission. Thiss apparatus includes a first bevel gear, clutch means actuatable to operatively connect the engine shaft to the first bevel gear to rotate same and a second bevel gear operatively connected to the transmission input shaft to drive same. A third bevel gear, situated in engagement with the first and second bevel gears, is rotatably mounted on a rotatable bracket. Second clutch means are provided which are actuatable to operatively connect the bracket to the second bevel gear such that when the first clutch means is deactuated, none of the gears are rotated by the rotating engine shaft and when the first clutch means is actuated and the second clutch means is not actuated, the first bevel gear causes the third bevel gear to rotate the second bevel gear in a direction opposite to the rotation of the engine shaft. Further, when both the first and second clutch means are actuated, the first bevel gear rotates the bracket and third bevel gear which is in mesh with the second bevel gear and, therefore, rotates as a single unit in the same direction as the engine shaft.

First brake means actuatable to deactuate the first clutch means and engage the first bevel gear to prevent the rotation thereof, are provided. Similarly, second brake means actuatable to deactuate the second clutch means to prevent the rotation of the bracket are provided. First and second brake means actuating means for actuating the first and second brake means, respectively, are operatively connected to the gear shift control lever by means of a hydraulically controlled piston and cylinder arrangement. In this manner, when the gear shift control lever is in the "neutral" position, the differential gear system disconnects the engine output shaft from the transmission. When the gear shift control lever is in the "drive" or the "reverse" position, the differential gear system connects the engine shaft to the transmission such that the input shaft of the transmission is rotated in the appropriate direction.

To the accomplishment of the above and to such other objects as may hereinafter appear, the present invention relates to a transmission having a continuously varible speed ratio as set forth in the accompanying claims and described in the specification taken together with the drawings wherein like numerals refer to like parts and in which:

FIG. 2B is a side elevational view of the differential gearing system of the present invention;

FIG. 2C is a cross-sectional view of the differential gearing of the present invention;

FIG. 2D is a view of the differential gearing of the present invention taken along line 2D—2D of FIG. 2C;

FIG. 2E is a cross-sectional view taken along line 2E—2E of FIG. 2B;

FIG. 5 is a cross-sectional view taken along line 5—5 of FIG. 3;

FIG. 6 is a cross-sectional view taken along line 6—6 of FIG. 4;

FIG. 8 is a cross-sectional view taken along line 8—8 of FIG. 3.

Figure 1A:
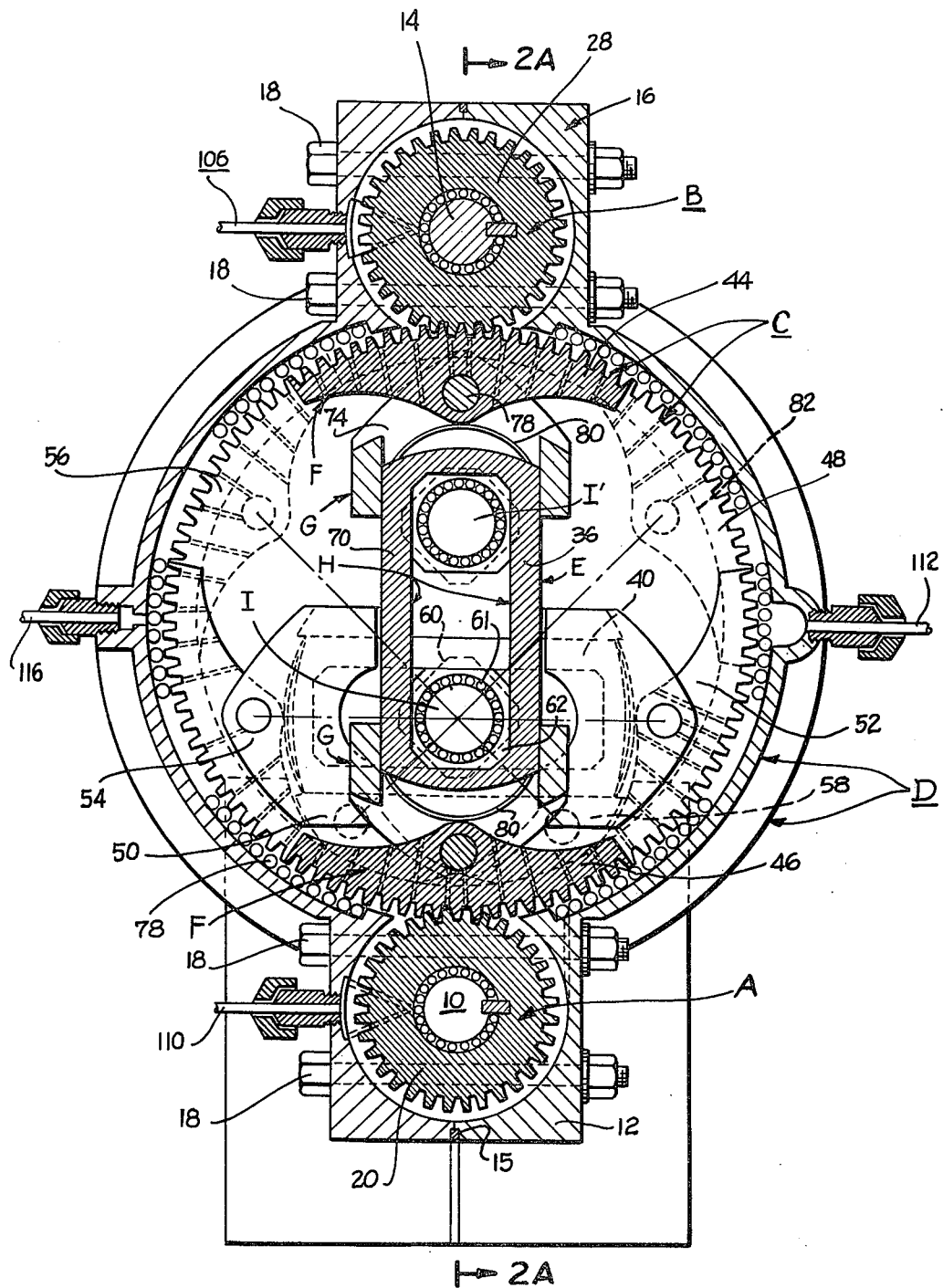
FIG. 1A is a front elevational view of a stage of the transmission of the present invention.

The present invention relates to a transmission having a continuously variable speed ratio comprising a plurality of stages, each of which includes an input or drive gear, generally designated A, and an output idler or driven gear, generally designated B, which are spaced from each other. Situated between drive gear A and driven gear B in each stage and in constant meshing engagement therewith is a composite ring gear, generally designated C. Composite ring gear C is situated within a housing, generally designated D, having a circular opening therein. Housing D also supports drive gear A and driven gear B which extend into the circular opening therein at diametrically opposite positions along the opening.

The composite ring gear C comprises at least one elongated element, generally designated E, preferably in the form of a fulcrum bar, having mounted thereon at each end a gear sector, generally designated F. Each of the gear sectors F is connected to element E by means of a sliding connector, a cap, generally designated G. Between caps G and the ends of element E, are semi-elliptical pressure springs for moving the caps and gear sectors outward so that the periphery of the several gear sectors conform to the circle of the composite ring gear. A slot, generally designated H, is formed within element E extending longitudinally and centered along the length of element E. A fulcrum shaft, generally designated I, extends through slot H and determines the axis of rotation and the transfer ratio of the element.

As described in detail below, fulcrum shaft I is movable with respect to element E to change the axis of rotation thereof. As shown in FIG. 1B, the distance between the axis of rotation of drive gear A and the center of fulcrum shaft I is one-half the distance between the axis of rotation of driven gear B and the center of fulcrum shaft I. Therefore, driven gear B will rotate twice as fast as drive gear A. Thus, the transfer ratio of this stage of the transmission will be 1:2. The transmission includes a plurality of stages, each of which has the identical transfer ratio and it is the product of these transfer ratios which determines the aggregate transfer ratio of the final output shaft of the transmission. Since the maximum transfer ratio of the exemplary embodiment of each stage of the present invention is 1:2, the maximum aggregate transfer ratio of the transmission will be equal to $1:2^x$ wherein the exponent $x$ equals the number of stages in the transmission. Thus, one revolution of the engine's input shaft will produce 64 revolutions of the transmission's final output shaft when the transmission has six stages.

Fulcrum shaft I is movable from the position shown in solid in FIG. 1B to the position shown in phantom therein in order to vary the transfer ratio from a maximum to a minimum. In the position shown in phantom in FIG. 1B, the distance between the axis of rotation of drive gear A and the center of fulcrum shaft I is equal to twice the distance between the axis of rotation of driven gear B and the center of fulcrum shaft I. Thus, in this position, the transfer ratio is 1:(½), the minimum ratio, where drive gear A makes one revolution to one-half revolution of driven gear B. If each stage of the transmission is operating in the minimum transfer mode, then the aggregate transfer ratio of the transmission will be equal to $1(½)^x$ wherein the exponent $x$ equals the number of stages in the transmission. Thus, one revolution of the engine's input shaft will produce 1/64th of a revolution of the transmission's output shaft if the transmission has six stages.

As described in detail below, the transfer ratio for each of the stages can be simultaneously varied in infinitely minute increments between the minimum and maximum ratios, and vice versa. Therefore, the aggregate transfer ratio range of the transmission is from $1:2^x$ to $1:(½)^x$. It should be appreciated that in a transmission having only six stages, an aggregate transfer ratio from 64:1, the lowest, to 1:64, the highest, is achieved. In addition, it should be understood that these figures are merely exemplary and that by changing the ratio of the distances between the axis of rotation of the drive gear and the axis of rotation of the composite gear as compared with the distance between the axis of rotation of the driven gear and the axis of rotation of the composite ring gear, different numerical bases can be achieved which will produce different ratio ranges.

For simplicity of understanding, FIG. 1B shows the composite ring gear as having only a single element E with a single pair of ring gear sectors F mounted thereon. Each of these sectors F covers an arc of only about 80° and, thus, in aggregate, only about 160° of the 360° composite ring gear is shown. It should be appreciated, as described in detail below that each composite ring gear C comprises a number of elements E, each having a pair of ring gear sectors F mounted thereon. Elements E are rotatably offset about fulcrum shaft I with respect to each other such that the sectors F connected to one element E slightly overlap the sectors F on the next element E and, therefore, in aggregate, a complete 360° ring gear is formed. In addition, it should be recognized that each of the elements E of the composite ring gear are spaced along the length of fulcrum shaft I and that each of the drive gears A and driven gears B are actually a plurality of gears spaced along the appropriate shafts, each being aligned with one of the elements E, respectively, such that one of the plurality of gears which comprise the drive gear A and one of the plurality of gears which comprise the driven gear B are always in meshing engagement with at least one of the elements E, by means of the sectors F mounted thereon. Therefore, the composite ring gear, whatever its rotational position may be, is designed such that torque is continuously transferred between the drive gear A and the driven gear B.

Figure 1B:
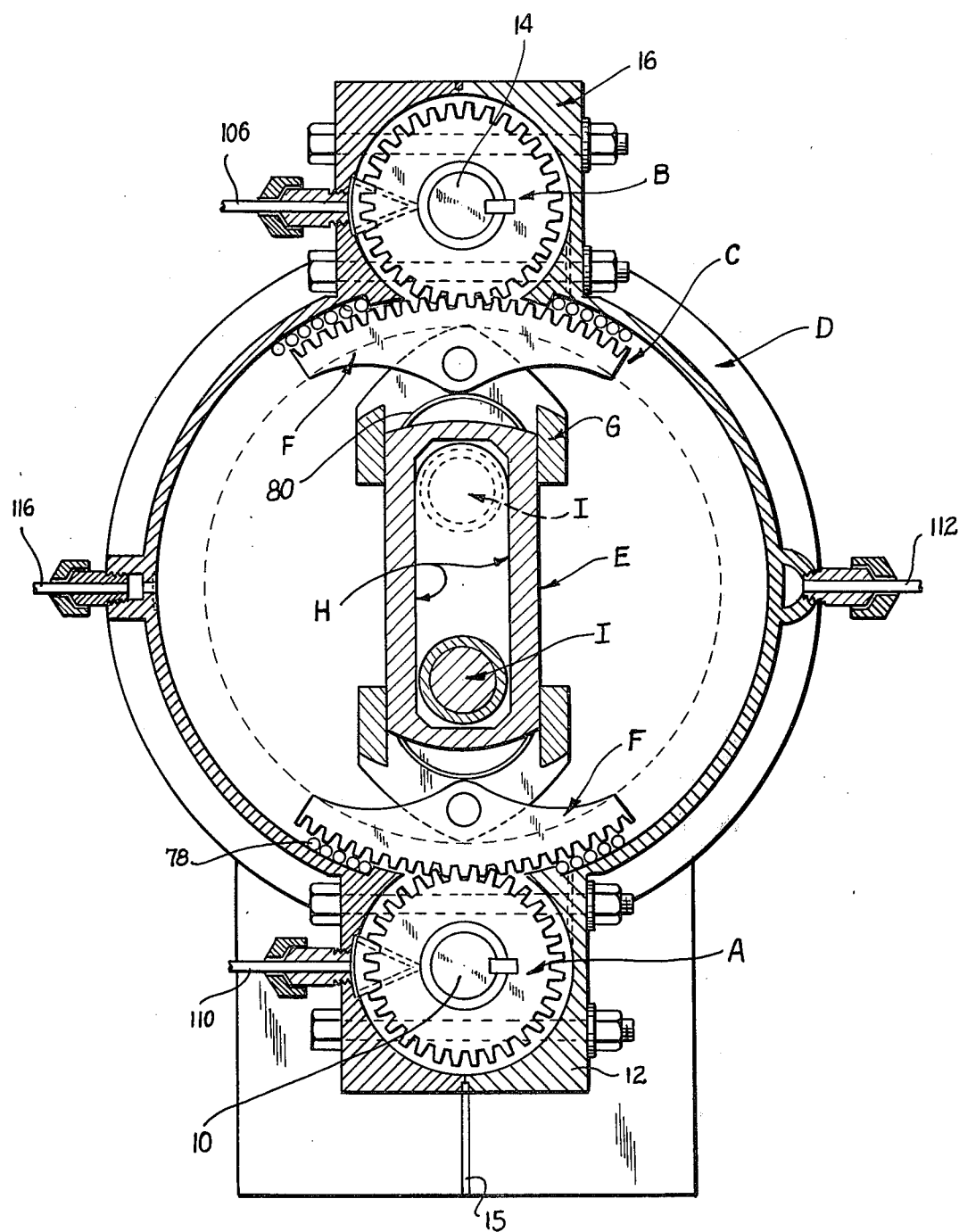
FIG. 1B is a view similar to that shown in FIG. 1A but wherein only a single element of the composite ring gear is shown.
Figure 2A:
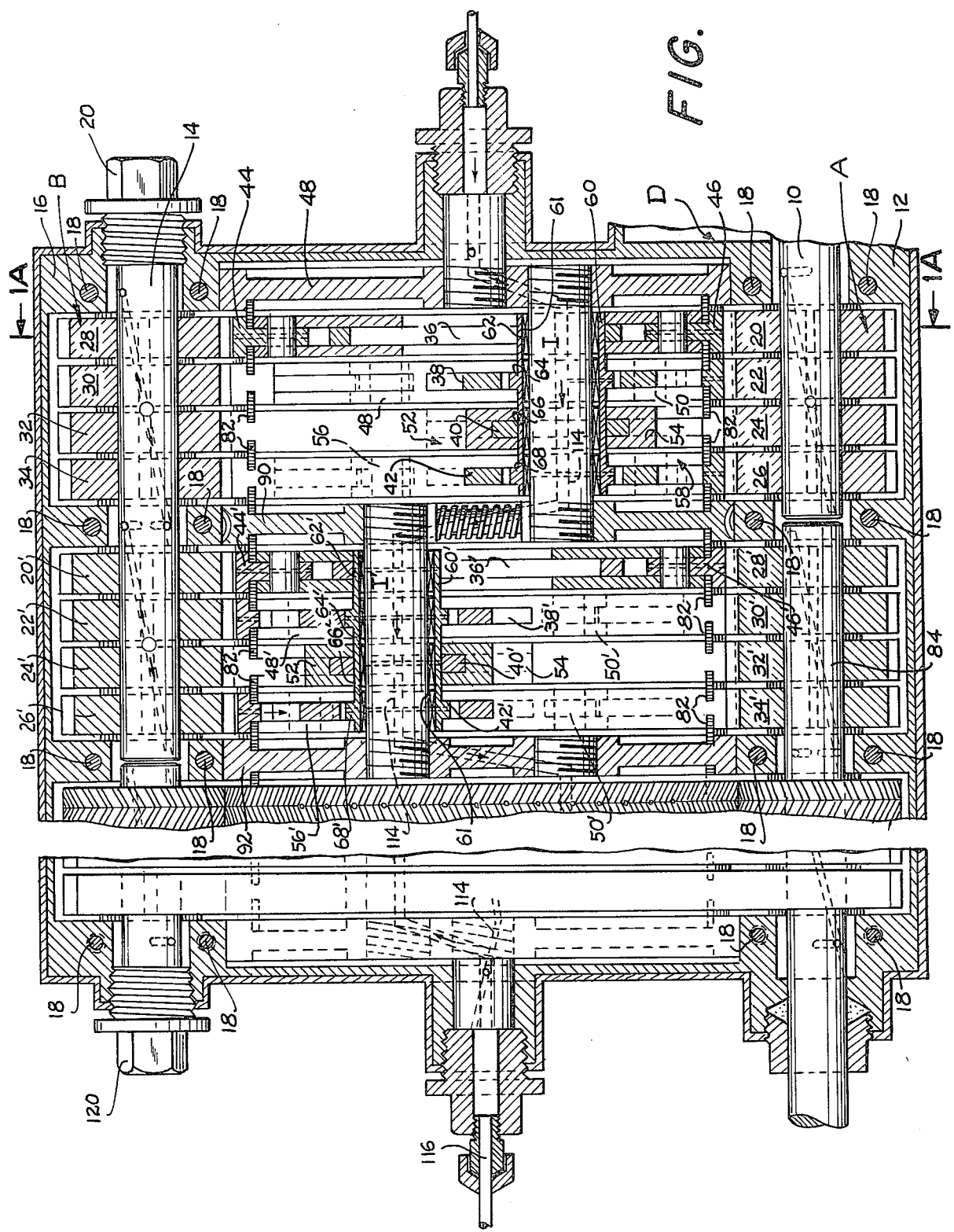
FIG. 2A is a side elevational view of the transmission of the present invention showing the first two stages comprising the composite ring gears thereof in detail.

The actual structure of the transmission stages can best be appreciated by considering FIGS. 1A and 2A. The drive gear A of the first stage of the transmission is mounted on and keyed to the transmission input shaft 10 within a block 12 on the lower end of housing D. In a similar manner, the driven gear B is mounted on and keyed to an idler shaft 14 mounted in a block 16 on the top of housing D. In actuality, housing D is formed in two parts, each having a semicircular central portion with a half-block on the top and bottom thereof. When assembled, blocks 12 and 16 are formed on the top and bottom of the housing, respectively, to receive the shafts to which the drive and driven gears are mounted. The central circular opening is formed to retain the ring gears. A plurality of pairs of bolts 18 are utilized to fasten the parts of block 12 and block 16, respectively, together to assemble the housing. The appropriate gasket 15 is utilized to form an oil tight seal between the halves of housing D.

Drive gear A comprises four separate gears 20, 22, 24 and 26, each of which is keyed to shaft 10. Gears 20, 22, 24 and 26 are spaced along the length of shaft 10 by spacer washers between them. In a similar manner, driven gear B comprises a plurality of four individual gears 28, 30, 32 and 34, each of which is keyed to shaft 14. Gears 28, 30, 32 and 34 are spaced along shaft 14, by means of similar spacer washers, so that each of the individual gears comprising driven gear B corresponds to one of the individual gears comprising drive gear A and is rotatable in the same place therewith. More specifically, gear 20 corresponds to gear 28, gear 22 corresponds to gear 30, gear 24 corresponds to gear 32 and gear 26 corresponds to gear 34.

In addition, a separate element E and a pair of ring gear sectors F mounted thereon coacts with each pair of corresponding drive and driven gears. Thus, element 36 coacts with gears 20 and 28, element 38 coacts with gears 22 and 30, element 40 coacts with gears 24 and 32, and element 42 coacts with gears 26 and 34. Each of the elements 36, 38, 40 and 42 has a pair of ring gear sectors F mounted thereon, one on each end thereof. Sectors 44 and 46 are mounted on the opposite ends of element 36. Sectors 48 and 50 are mounted on the opposite ends of element 38. Sectors 52 and 54 are mounted on the opposite ends of element 40, and sectors 56 and 58 are mounted on the opposite ends of element 42. Each of the elements 36, 38, 40 and 42 are rotationally offset from the elements adjacent thereto by 45° and each of the ring gear sectors 44, 46, 48, 50, 52, 54, 56 and 58 cover an arc of approximately 80° such that there is sufficient overlap between adjacent sectors to assure that at least one pair of gear sectors on one element E is in contact with one of the drive gears A and a corresponding driven gear B at all times so that torque is continuously transferred regardless of the position of the fulcrum shaft and the transfer ratio of the composite ring gear.

Each of the elements 36, 38, 40 and 42 are mounted on a long single sleeve 60 which is freely rotatable on fulcrum shaft I. A plurality of needle roller bearings 61 are situated around shaft I between the shaft and sleeve 60 such that the sleeve is freely rotatable on the shaft. Sleeve 60 has four separate square sections 62, 64, 66, 68, each offset by 45° from the adjacent one, upon which elements 36, 38, 40 and 42, respectively, slide. Each of the sleeve sections 62, 64, 66 and 68 has a substantially square cross-sectional configuration with the sides thereof being rotationally offset by 45° from the adjacent section. This maintains each of the elements 36, 38, 40 and 42 at the appropriate rotationally offset position from the other elements.

Figure 7A:
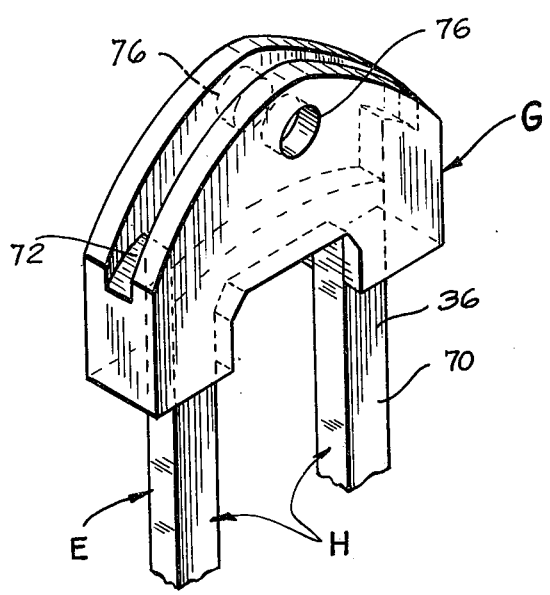
FIG. 7A is an isometric view of an element forming a part of the composite ring gear, including the slidable cap thereon.
Figure 7C:
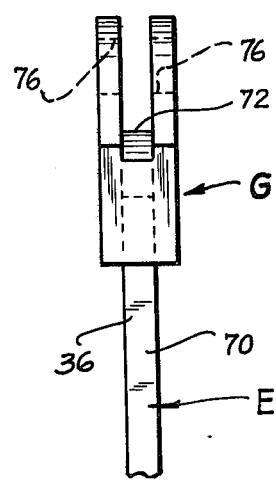
FIG. 7C is a side view of the element shown in FIG. 7A.
Figure 7B:
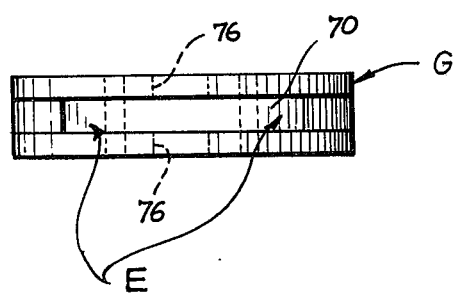
FIG. 7B is a plan view of the element shown in FIG. 7A.

A sliding connection is formed between each element E and the square section of sleeve 60 on which it is mounted. This connection is a result of the shape of the elements E as best seen in FIGS. 7A, 7B and 7C wherein the upper half of element 36 is illustrated. The elongated body portion 70 of element 36 is essentially rectangular in cross-section having a slightly arcuate top and bottom surface 72. Slidably mounted to the top and bottom of elongated body section 70 is a cap G which has an essentially U-shaped cross-section with arcuate exterior top surfaces that match the curve of the arcuate top surfaces of element E. The legs of cap G are spaced from each other an amount sufficient to permit the ring gear sector to be received within the recess formed by the legs. An aperture 76 is formed in each of the legs such that a pin can be inserted therethrough. The ring gear sector F to be mounted in the cap G is provided with a matching aperture 76 therein to receive a pin 78, on which it can rotate back and forth. Semi-elliptical springs 80 within caps G press on the arcuate end surfaces of element E and on the gear sectors F so that they move outward and are continuously made to conform to the circular periphery of the composite ring gear C. At the same time, springs 80 keep element E centered between the end gear sectors F. The maximum elongation of element E with its caps G and gear sectors F occurs when its longitudinal axis coincides with the horizontal axis through input gear shaft 10 and the idler gear shaft 14; and the maximum contraction of the unit occurs when its longitudinal axis is perpendicular to the axis through input gear shaft 10 and idler gear shaft 14.

An elongated slot H is formed within the body portion 70 of the element E. The square collar portion of sleeve 60, rotatable on fulcrum shaft I, upon which the element E is mounted extends through slot H. The square sides of the collar section fit snugly within the slot H, permitting a sliding connection between the element E, the fulcrum bar and the fulcrum shaft I but prohibiting any rotation of the element E relative to the fulcrum shaft sleeve 60 upon which it is mounted. Thus, as the fulcrum shaft changes position with respect to the element E, in the manner described in detail below, the square section of fulcrum shaft sleeve 60 will move along slot H between an extreme position at one end thereof to an extreme position at the other end thereof. As indicated before, the position of the fulcrum shaft and its sleeve with respect to the elongated body portion of the elements E determines the speed transfer ratio of the particular stage. Since each element in a single stage is mounted on the same fulcrum shaft sleeve, the speed transfer ratio for each element of the stage is equal and the transfer ratio of the composite ring gear formed by the elements is a single ratio.

It should also be noted that the overall length of each element E in a single stage and the sectors mounted thereon changes according to the position of the element with respect to the drive and driven gears. This change in length is compensated for by the slidable connection between the gear sectors attached to caps G and the element E where springs 80 move the gear sectors outwardly along element E so that they conform to the circular periphery of the composite ring gear. When an element, together with gear sectors, is in contact with the drive and driven gears, the overall length thereof is at its greatest when the center line of the unit coincides with the center line through drive gear shaft 10, composite ring gear C, and driven gear shaft 14. This is shown by element 36 in FIG. 1A. However, as the element is rotated 90° to its minimum length position, as shown by element 40 in FIG. 1A, springs 80 are compressed by the inward movement of the gear sectors to shorten the overall length of the assembled element. It should be remembered that the variation in length of the assembled element with its gear sector extremities depends on the rotational position of the particular square section of the fulcrum shaft sleeve 60, on which the element slides.

The gear teeth on sectors F, as well as those on the component gears of the drive gear A and the driven gear B, are preferably of herringbone design for quiet operation and so that greater amounts of torque can be transferred between such gear teeth. Further, there is a space or gap provided between the interior wall of housing D and the edge of the gear teeth of the composite ring gear sectors around the entire circular opening in the housing, except where the drive and driven gears mesh with the composite ring gear. In this space are provided a plurality of needle roller bearings, one surrounding each pair of gear sectors on a single element E, to facilitate frictionless rotation of the composite ring gears C and hold all of them concentric. In addition, T-shape cross-sectioned circular rings 82 are inserted in matching recesses in the sides of all gear sectors and rotatable discs 88, 90, 92, etc. to restrain the ring gear sectors to move in a concentric circular path. The width of the V-shape herringbone teeth on gear sectors F is wider than the center to center spaces between successive bearing rollers so that these rollers cannot become wedged in between the herringbone gear teeth.

In the manner described above, torque is transferred from transmission input shaft 10 to an idler shaft 14 at a transfer ratio determined by the position of the fulcrum shaft I. Idler shaft 14 extends laterally into the second stage of the transmission wherein the drive gear of the second stage is keyed and mounted thereon. The drive gear of the second stage of the transmission is comprised of four gears identical with the four gears of drive gear A of the first stage of the transmission which are designated 20', 22', 24', and 26'. All components of the second stage being identical to the components of the first stage are, therefore, designated by the same numerals as the corresponding part in the first stage with a prime thereon. A second idler shaft 84, collinear with input shaft 10 but freely rotatable with respect thereto, is provided having a plurality of driven gears 28', 30', 32', 34' keyed and mounted thereon in a manner similar to driven gear B of the first stage of the transmission. A plurality of elements 36', 38', 40' and 42' are rotationally offset about a fulcrum shaft sleeve 60' rotatable on a fulcrum shaft I'. Each of the elements 36', 38', 40', 42' being mounted on a square section portion 62', 64', 66', 68', respectively, which make up the fulcrum sleeve 60'. Element 36' has ring gear sectors 44' and 46' mounted on opposite ends thereof. Element 38' has gear sectors 48' and 50' mounted on opposite ends thereof. Element 40' has gear sectors 54' and 52' mounted on opposite ends thereof, and element 42' has gear sectors 56' and 58' mounted on opposite ends thereof.

The composite ring gear in the second stage of the transmission functions precisely in the same manner as the composite gear in the first stage of the transmission except the drive gears and the driven gears are interchanged in position with respect to the corresponding gears in the first stage of the transmission. Shaft 84 which is the output shaft of the second stage of the transmission is operatively connected to the input shaft of the third stage of the transmission (not shown). Likewise, the output shaft of each stage in the transmission is operatively connected to the input shaft of the next successive stage such that torque is transferred from stage to stage until at the last stage the output shaft is the transmission's final output shaft 86 which, in turn, is connected to the drive shaft of the vehicle.

As previously mentioned above, the aggregate transfer ratio of the transmission is equal to the product of the transfer ratio of the individual stages. The aggregate transfer ratio of the transmission is determined by the position of each of the fulcrum shafts I in each composite ring gear with respect to the axes of rotation of the respective drive and driven gears. The fulcrum shaft of each transmission stage is interconnected with the remainder of the fulcrum shafts in a manner which can best be understood with reference to FIGS. 3 and 4.

These figures show the first two stages of the transmission which correspond to the stages shown in FIG. 2A. Each of the fulcrum shafts I and I' shown has a cylindrical center section having a smooth exterior surface about which rotates a fulcrum shaft sleeve 60 upon which the elements are mounted. The end sections of each of these fulcrum shafts are provided with threaded portions which screw into threaded recesses in a pair of rotatable discs between which the shaft is mounted. Three of these rotatable discs 88, 90 and 92 are shown. Rotatable disc 88 is situated between the front wall of housing D and the ring gear which forms the first stage of the transmission. Rotatable disc 90 is situated between the first and second stages of the transmission and rotatable disc 92 is situated between the second stage of the transmission and the third stage of the transmission (not shown). Each of these rotatable discs 88, 90 and 92 has a collinear axis of rotation and the fulcrum shafts I and I' are mounted between the designated pairs of discs at a position which is radially offset from the axis of rotation of the discs.

The fulcrum shafts of successive stages, while radially offset from the axis of rotation of the discs by an equal distance are offset in diametrically opposed directions such that the fulcrum shafts in the odd stages of the transmission are collinear with each other and the fulcrum shafts in the even stages of the transmission are collinear with each other, but the axes of the fulcrum shafts in the odd transmission stages are spaced from the axes of the fulcrum shafts on the even stages of the transmission by a distance equal to twice the distance which the fulcrum shafts are radially offset from the axis of rotation of the discs. This design gives the discs and fulcrum shafts a configuration similar to that of a conventional single plane crankshaft.

Disc 90 and every second one of the discs in the transmission is provided with a set of peripheral gear teeth 94 which mesh with a worm gear 96 mounted on a shaft 98 rotatably mounted within a housing 95, an integral part of housing D (see FIGS. 5 and 8). On one end of shaft 98 is provided a gear 100 which, in turn, meshes with a second worm gear 102 (FIG. 6) mounted on a shaft 104 which extends within housing D throughout the length of the transmission. At the end of shaft 104 is provided a motor 118M, shown in cross-section in FIG. 4, which is hydraulically controlled to rotate shaft 104. The rotation of shaft 104 rotates worm gear 102, gear 100, shaft 98, worm gear 96 and, thus, rotates disc 90. Every second disc in the transmission is provided with a similar rotation mechanism such that each of these discs is simultaneously rotated by the rotation of shaft 104. Since each of these discs is connected to the discs adjacent to it by means of the fulcrum shafts extending therebetween, the rotation of shaft 104 serves to rotate all of the discs in the transmission simultaneously and, thus, to determine the position of each of the fulcrum shafts simultaneously.

In order for the transfer ratio of each stage to be equal, it is necessary that in each stage the ratio of the distance between the axis of rotation of the composite ring gear and the drive gear as compared to the distance between the axis of rotation of the composite ring gear and the driven gear be equal. It is for this reason that alternate fulcrum shafts must be staggered or rotationally offset 180° in opposite directions, with respect to the axis of rotation of the discs, as the torque is transferred in opposite directions by alternate stages. The rotation of the discs in a particular direction will cause the fulcrum shaft in each stage to move relative to the drive and driven gears in that stage to the identical degree. Thus, the transfer ratio of each stage changes simultaneously and in the identical manner with the ratio of all other stages.

Figure 3:
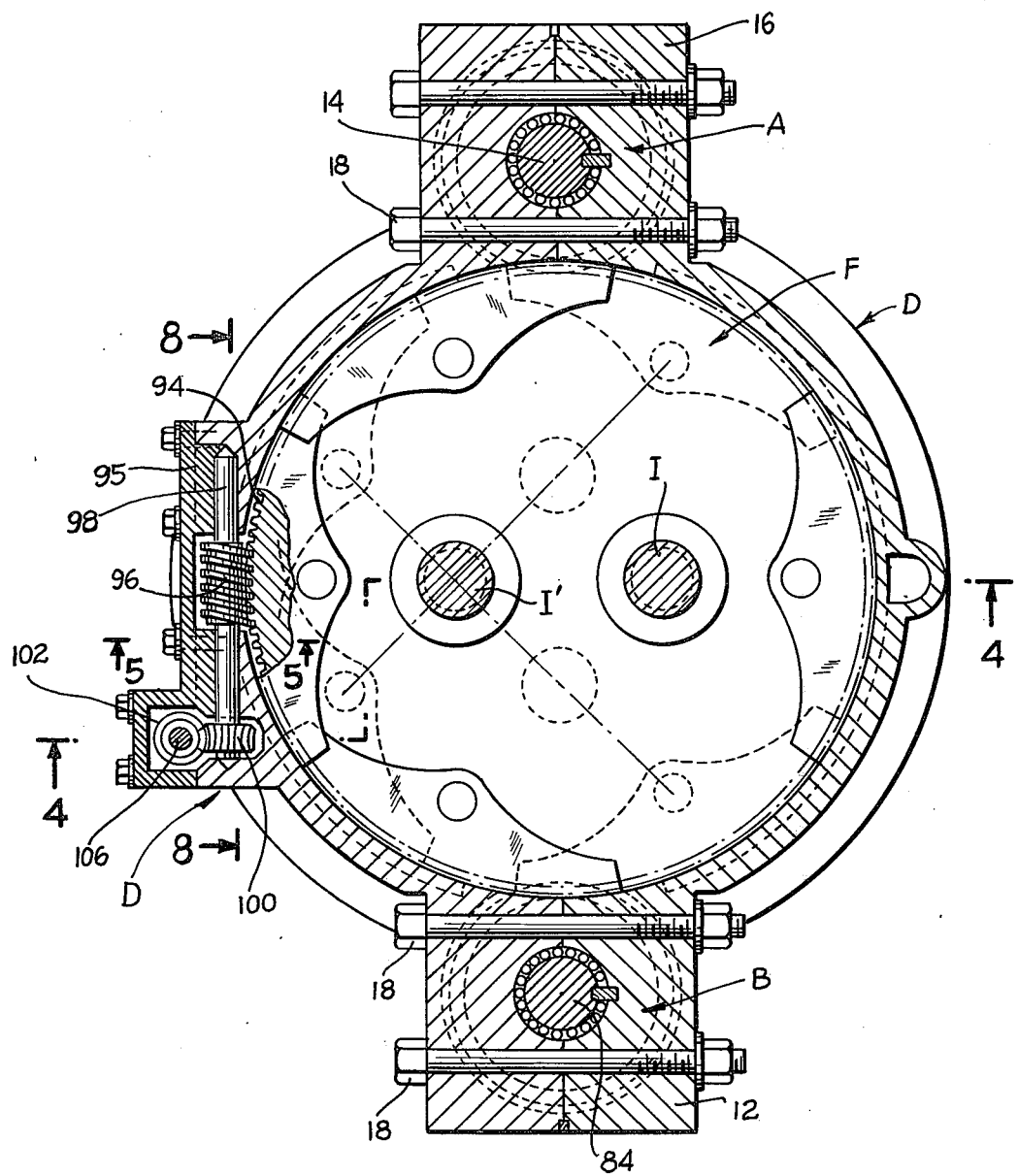
FIG. 3 is a cross-sectional view of a portion of the axis position varying means taken along line 3—3 of FIG. 4.
Figure 4:
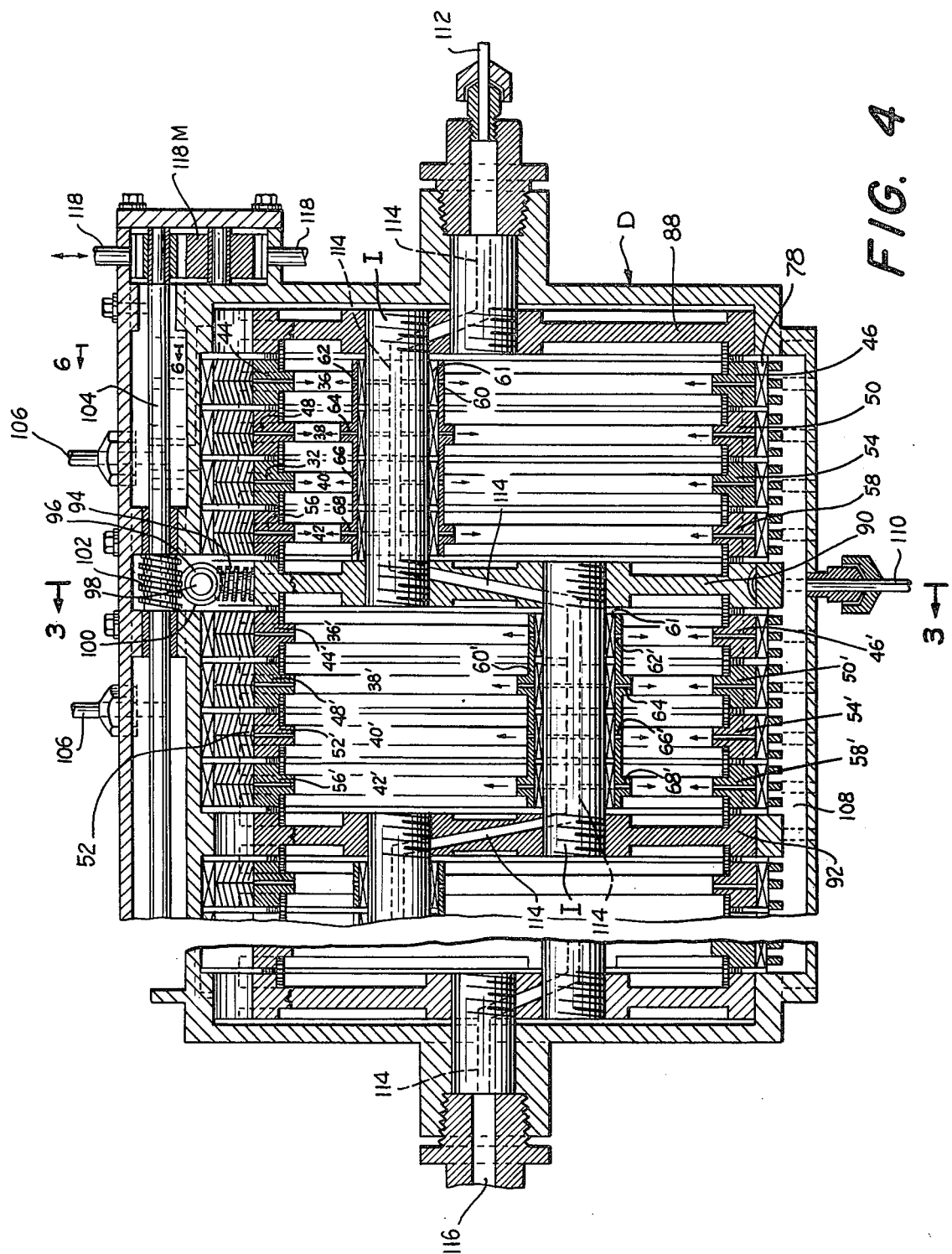
FIG. 4 is a vertical cross-sectional view through the transmission of the present invention showing the first two stages thereof in detail.

As shown in FIGS. 1A and 2A, the position of the fulcrum shafts are such that the transmission's final output shaft rotates at its maximum speed of 64 revolutions to one revolution of the engine's input shaft. As shown in FIGS. 3 and 4, the position of the fulcrum shafts (rotated 90° from positions shown in FIGS. 1A and 2A) are such that the transmission's final output shaft rotates at the exact same speed as the engine's input shaft. When the fulcrum shafts are rotated another 90°, making the total rotation 180° from that shown in FIGS. 1A and 2A, the fulcrum shafts again are in the same plane at the center line of the input and output shafts 10 and 14, except that the first stage fulcrum is now on the far side from the engine's input shaft, and the transmission's final output shaft rotates 1/64th of a revolution to one revolution of the engine's input shaft.

A plurality of oil inlet conduits 106 are provided on the top (as seen in FIG. 4) of housing D to provide oil in the space between the interior wall of housing D, needle roller bearings 78 and the composite ring gears, as well as an oil flow between the elements themselves.

On the opposite end, the bottom of housing D is an oil reservoir or sump 108 which is connected to an oil outlet conduit 110 through which the oil exits the housing and is conducted to a filter and pump (not shown) to be recirculated. In addition, an oil inlet conduit 112 is provided at the front end of housing D collinear with the axis of rotation of the discs 88, 90 and 92. An oil conduit 114 passes through the discs and each of the fulcrum shafts, in turn, to lubricate the fulcrum shaft sleeves 60 which rotate on the respective fulcrum shafts. In addition, a plurality of oil outlet openings in the fulcrum shaft sleeves themselves permit oil to be fed from conduit 114 into the spaces between the rotating elements. The end of oil conduit 114 is joined to an oil outlet conduit 116 which returns the oil to the filter and pump (not shown) to again be recirculated. In addition, oil is provided by means of conduits 118 to the hydraulically controlled motor and to the exterior of shaft 104.

It also should be noted that idler gear shaft 14, and the shafts collinear therewith, are situated within a tubular opening extending through the length of housing D and that these tubular openings at either end of housing D have screw-in plugs 120 situated in an oversized bore. The bore in which screw plugs 120 are situated has a diameter larger than is necessary for the insertion of the shafts to permit the boring of the tubular openings in which the shafts rotate after preliminary assembly of the housing D such that perfect alignment of the openings is assured. The same is true for shafts collinear with input shaft 10 and output shaft 86. Also, these tubular openings are fitted with needle roller bearings on which the shafts 10 and 14 rotate.

In the matter of lubrication, it should be noted that only a sufficient amount of oil is supplied to gear teeth, rotating shafts, sleeves, etc., to provide proper lubrication of all moving and rubbing parts for smooth operation. An excess supply of oil would churn between the gears and set up a rotational resistance within the transmission, and thereby reduce its efficiency.

The input shaft 10 of the first stage of the transmission is operatively connected to the output shaft 122 of the differential gear system shown in FIGS. 2C, 2D and 2E. The input shaft of the differential gear system 124 is operatively connected to the engine shaft. The diffferential gear system comprises a housing 126 forming a box-like enclosure for the mechanism. Within the mechanism, a collar 128 is keyed to shaft 124 for rotation therewith. Coaxially mounted with shaft 124 is a first bevel gear 130 which is mounted around collar 128 to be freely rotatable with respect thereto.

As seen in FIG. 2D, bevel gear 130 is provided with a series of cylindrically shaped recesses 132, each having a piston member 134 mounted therein. Piston member 134 is movable within recess 132 in a direction parallel to the axis of rotation of shaft 124. Each piston member 134 is provided with an opening therethrough, transverse to the direction of motion of the member, in which are situated a pair of spring loaded ball bearings 136. A pair of ball bearing receiving recesses 138 are provided, one in collar 128 and the other in bevel gear 130. A collapsible rod 140 extends outwardly beyond both sides of member 134. One side of rod 140 is provided with a brake pad 142, the purpose of which is described below. The other side of rod 140 is seated in bevel gear 130 and a spring 144 is situated between the bottom of recess 132 and the wall of member 134 tending to urge member 134 laterally outward of recess 132 towards the position wherein ball bearings 136 are seated in ball bearing receiving recesses 138. When ball bearings 136 are seated in recesses 138, an operable connection is made between collar 128 and bevel gear 130 such that bevel gear 130 rotates with collar 128 which is keyed to input shaft 124.

In this position, non-rotatable brake pad 142 of bevel gear 130 extends almost to the surface of brake 146 which is movable, by means described in detail below, towards bevel gear 130 in order to collapse rods 140 and, thus, push members 134 deeper into recesses 132. This movement causes ball bearings 136 to be removed from ball bearing receiving recesses 138 thereby disconnecting collar 128 from bevel gear 130 to permit relative rotation therebetween. Thus, this mechanism acts as a clutch which, when brake 146 is actuated, holds and detaches bevel gear 130 from collar 128 and prevents gear 130 from rotating.

A second bevel gear 148 is keyed to shaft 122 to drive same. A four-legged spider bracket 150 (shown in FIG. 2E) is mounted for rotation about shaft 122 relative to bevel gear 148. A second clutch mechanism, similar to the one described above, is situated between bevel gear 148 and spider bracket 150. This mechanism comprises a plurality of cylindrical recesses 152, each having a piston member 154 movably mounted therein. An opening transverse to the direction of motion of member 154 within recess 152 is provided with a pair of spring loaded ball bearings 156 which, when member 154 is in its outermost position with respect to recess 152, because of the urging of a spring 155, the ball bearings 156 are received within ball bearing receiving recesses 158 thereby forming an operable connection between the spider bracket and bevel gear 148. However, when brake 170 is actuated, brake pads 168 are engaged collapsing rods 160 causing members 154 to move along recess 152 and thereby causing ball bearings 156 to leave ball bearing receiving recesses 158 thus disconnecting spider bracket 150 from bevel gear 148.

On each of the legs of spider bracket 150 are rotatably mounted a bevel gear 172. Each of the bevel gears 172 is always in meshing engagement with both the first bevel gear 130 and the second bevel gear 148. All of the bevel gears 130, 148 and 172 preferably have helical gear teeth for quiet operation and to permit the transfer of high torque therebetween.

As seen in FIG. 2D, in diametrically opposite corners of housing 126 are two closed end hydraulic cylinders 174 and 176. Within each of these cylinders 174 and 176 are a pair of slidable pistons 178 and 180 and 178a and 180a, respectively. Pistons 178 and 178a are operatively connected to brake 146 by members 182 and 182a, respectively. In a similar fashion, piston 180 and piston 180a are connected to non-rotatable brake 170 by means of elements 184 and 184a, respectively. An aperture 186 is formed in the wall of cylinder 174 between piston 178 and the end wall of the cylinder. In a similiar fashion, an aperture 186a is formed in the wall of cylinder 176 between the piston 178a and the end wall of the cylinder. Aperture 186 is operatively connected to a source of hydraulic fluid by means of conduit 188. In a similar fashion, aperture 186a is operatively connected to a source of hydraulic fluid by means of conduit 188a. An aperture 190 is formed in the wall of cylinder 174 between piston 180 and the end of the cylinder. In a similar fashion, aperture 190a is formed within the wall of cylinder 176 between piston 180a and the end of the cylinder. Apertures 190 and 190a are connected to a source of hydraulic fluid by means of conduits (not shown), similar to 188 and 188a but on the far side in FIG. 2D.

The introduction of hydraulic fluid under pressure through apertures 186 and 186a causes pistons 178 and 178a to move towards the center of the respective cylinders in which they are situated thereby actuating brake 146 via members 182 and 182a to deactuate the clutch mechanism thereby detaching first bevel gear 130 from collar 128. When the hydraulic fluid is removed, springs 192 and 192a cause pistons 178 and 178a to return to their original positions thereby releasing the brake 146 and causing the clutch mechanism to be actuated thereby connecting bevel gear 130 and collar 128.

In a similar manner, when hydraulic fluid under pressure passes through apertures 190 and 190a, pistons 180 and 180a are moved towards the center of the cylinders in which they are situated thereby causing brake 170 to be actuated by means of members 184 and 184a. This deactuates the clutch mechanism adjacent thereto thereby disconnecting bevel gear 148 from spider bracket 150. When the hydraulic fluid is removed, springs 192 and 192a move pistons 180 and 180a towards their original position thereby releasing brake 170 and causing the clutch mechanism to once again engage connecting spider bracket 150 with bevel gear 148.

When the throttle is not being depressed and the gear shift control lever is in "neutral", hydraulic fluid under pressure is fed through apertures 186 and 186a to actuate brake 146 thereby disconnecting collar 128 from first bevel gear 130. Therefore, in this mode of operation, the turning of the engine shaft does not rotate any of the gears in the differential gearing system and no torque is transferred therethrough.

When the gear shift control lever is placed in the "drive" position, the hydraulic fluid is no longer applied through apertures 186 and 186a such that pistons 178 and 178a are returned to their original position by springs 192 and 192a thereby releasing brake 146 and actuating the clutch mechanism to connect collar 128 to bevel gear 130. Therefore, the rotation of engine shaft 124 rotates bevel gear 130, which is in meshing engagement with spider gears 172 rotatably mounted on spider bracket 150. However, spider gears 172 are also in meshing engagement with the second bevel gear 148. In this mode of operation, bevel gear 148 is operatively connected to spider bracket 150 because of the clutch mechanism therein which is actuated because brake 170 is in the released position due to the lack of hydraulic fluid under pressure at apertures 190 and 190a. Since spider gears 172 in mesh with gear 148 are locked because spider gear bracket 150 is locked with gear 148, then the entire gear assembly including input bevel gear 130 must rotate as a single unit in the same direction as the engine shaft 124, therefore, the final output shaft 86 of the transmission will also rotate in the same direction as the engine shaft 124.

It should be noted that when the gear shift control lever is in the drive position, disc rotating shaft 104 which simultaneously determines the positions of all the fulcrum shafts in each of the transmission stages is rotated by a motor 118M shown in section in FIG. 4, in response to the actuation of the throttle. Thus, the transfer ratio of the transmission is changed continuously in accordance with the actuation of the throttle in a manner which assures that the proper transfer ratio is operating depending upon the desired movement of the vehicle.

When the gear shift control lever is in the "reverse" position, brake 146 remains released but brake 170 is actuated by the flow of hydraulic fluid under pressure into apertures 190 and 190a which, in turn, moves pistons 180 and 180a and brake 170 to cause the clutch mechanism to detach spider bracket 150 from bevel gear 148, and the brake 170 holds bracket 150 stationary while spider gears 172 are free to rotate. In this mode of operation, the rotation of bevel gear 130 rotates each of the spider bevel gears 172 mounted on the legs of spider bracket 150 which, in turn, rotates the second bevel gear 148. If engine shaft 124, and thus bevel gear 130, are rotated in a first direction, the transfer of torque through bevel gears 172 will cause gear 148 and output shaft 122 to rotate in the opposite direction, thereby providing the reversal of rotation of the transmission's output shaft, which is required when reversing the direction of the automobile.

When gear shift control lever is put in "reverse," it is preferable to have the hydraulically controlled motor which operates the disc rotating shaft 104 to rotate the fulcrum shafts in the transmission to the position of lowest transfer ratio so that the vehicle moves backwards slower than when gear shift control lever is put in forward "drive" position, when the transmission's transfer ratio can be higher so that the vehicle moves forward at a higher rate of speed, which arrangement is conventional in most transmissions.

It can, therefore, be seen that the present invention relates to a continuously variable speed transmission capable of providing a wide range of transfer ratios in a manner which uniquely matches the selected transfer ratio with the desired operation of the motor vehicle. In this way, the vehicle operates more efficiently and, thus, uses fuel more economically. In addition, engines of smaller displacement capacity can be utilized to achieve the same performance as larger engines utilized in conjunction with less efficient transmissions.

The transmission of the present invention is comprised of a plurality of stages, the number of which determines, in part, the transfer ratio range capability of the transmission and, thus, larger ranges can be achieved merely by the addition of duplicate parts. Further, each stage of the transmission is comprised of relatively simple and easily manufactured and assembled parts which can be relatively easily repaired and maintained and which will operate reliably throughout the life of the mechanism.

While but a single embodiment of the present invention has been disclosed herein for purposes of illustration, it is obvious that many modifications and variations can be made thereon. It is intended to cover all of these modifications and variations which fall within the scope of the present invention as defined by the appended claims.

I claim:
1. A transmission for transmitting torque from a drive gear to a driven gear comprising a composite ring gear operatively connecting said drive and driven gears, said ring gear comprising first and second ring gear sectors, a rotatable element, each of said sectors being mounted on a different end of said element such that when one sector engages said drive gear the other sector engages said driven gear and means operatively connected to said element for varying the position of the axis of rotation of said element relative to said drive and driven gears to change the ratio of the distances between the axis of rotation of said element and the drive and driven gears, respectively.

2. The transmission of claim 1 wherein said sectors are pivotally mounted to said element.

3. The transmission of claim 1 further comprising means for mounting said sectors to said element so that said sectors are laterally shiftable relative to said element.

4. The transmission of claim 3 wherein said sector is laterally shiftable relative to said element inwardly and outwardly and said mounting means comprises means for urging said sectors outwardly from said element.

5. The transmission of claim 3 wherein said mounting means comprises a cap slidably mounted on said element to which said sector is mounted and spring means urging said cap towards the outer extremity of said slot.

6. The transmission of claim 1 wherein said axis position varying means comprises a fulcrum shaft and a slot in said element extending in the direction between said sectors, said shaft extending into said slot thereby to determine the axis of rotation of said element and means for changing the position of said shaft relative to said slot.

7. The transmission of claim 6 wherein said shaft position changing means comprises a movable member, said shaft being mounted at one end thereof to said member for movement therewith and means for moving said members.

8. The transmission of claim 7 wherein said member is a circular disc having gear teeth on the outer surface thereof and wherein said member moving means comprises a gear engaging said teeth and means for driving said gear.

9. The transmission of claim 1 wherein said composite ring gear further comprises a plurality of rotatable elements and pairs of ring gear sectors, the sectors in each pair being mounted on opposite ends of a different one of said elements, each of said elements being rotationally offset with respect to said other elements, said sectors each covering an arc large enough to at least partially overlap the adjacent sectors such that an uninterrupted circular composite ring gear is formed.

10. The transmission of claim 9 wherein each of said elements is rotatable about the same axis.

11. The transmission of claim 9 wherein each of said elements has a slot extending in the direction between said sectors and further comprising a fulcrum shaft extending through each of said slots such that each of said elements rotates about a common axis determined by said shaft.

12. The transmission of claim 11 wherein said axis position varying means comprises means for changing the position of said shaft relative to said slots.

13. The transmission of claim 1 further comprising a plurality of successive composite ring gears, each operatively connecting a pair of drive and driven gears, the driven gear associated with one composite ring gear being operatively connected to the drive gear of the next composite ring gear in succession, each of said composite ring gears being rotatable about a different shaft, and means for moving said shafts to simultaneously vary the axis of rotation of each of said composite ring gears.

14. The transmission of claim 13 where every other fulcrum shaft is collinear.

15. The transmission of claim 13 where adjacent fulcrum shafts are displaced relative to each other.

* * * * *